Aug. 6, 1940.  S. A. SCHELKUNOFF  2,210,636
GUIDED WAVE TRANSMISSION
Filed Sept. 18, 1937   3 Sheets-Sheet 1

CE

CM $TE_{1,1}$ $TM_{1,1}$

INVENTOR
S. A. SCHELKUNOFF
BY  N. S. Ewing
ATTORNEY

Aug. 6, 1940.  S. A. SCHELKUNOFF  2,210,636
GUIDED WAVE TRANSMISSION
Filed Sept. 18, 1937    3 Sheets-Sheet 2

INVENTOR
S. A. SCHELKUNOFF
BY N. S. Ewing
ATTORNEY

Aug. 6, 1940.   S. A. SCHELKUNOFF   2,210,636
GUIDED WAVE TRANSMISSION
Filed Sept. 18, 1937   3 Sheets-Sheet 3
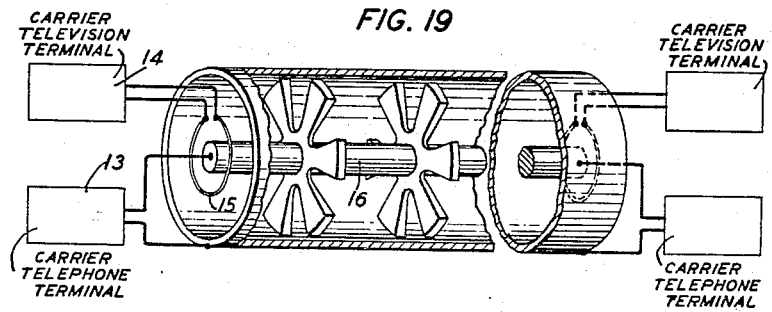
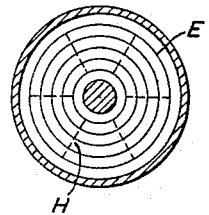
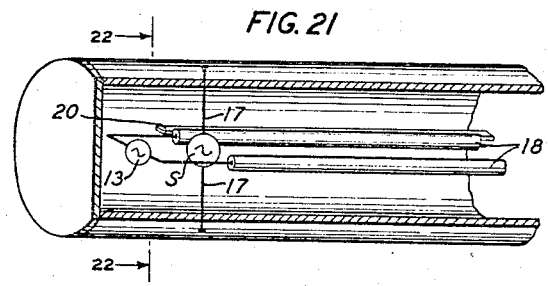
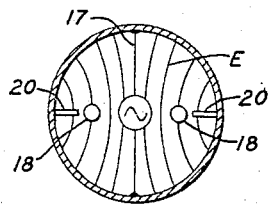
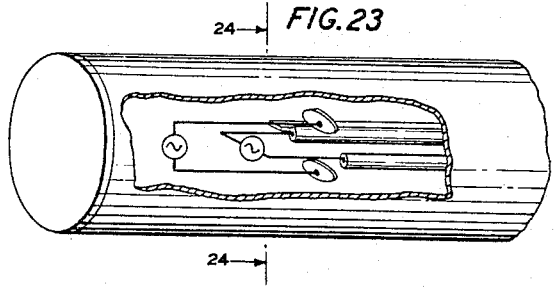
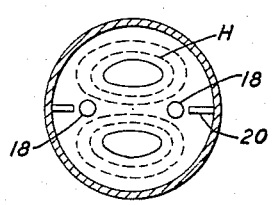
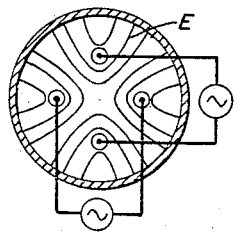
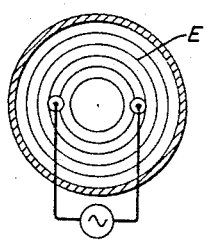
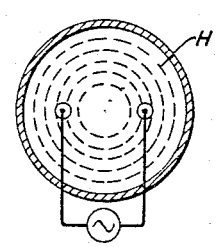
INVENTOR
S. A. SCHELKUNOFF
BY
ATTORNEY Patented Aug. 6, 1940

2,210,636

UNITED STATES PATENT OFFICE 2,210,636

GUIDED WAVE TRANSMISSION

Sergei A. Schelkunoff, New York, N. Y., assignor to Bell Telephone Laboratories, Incorporated, New York, N. Y., a corporation of New York Application September 18, 1937, Serial No. 164,473

16 Claims. (Cl. 178—44)

The present invention relates to the transmission of hyper-frequency electromagnetic waves and more particularly to the guided transmission of waves of the unique character disclosed in my copending application, Serial No. 56,959 filed December 31, 1935, which issued as U. S. Patent No. 2,147,717, February 12, 1939 and of which this application is, in part, a continuation.

An object of the invention is to provide new and improved systems for the guided transmission of electromagnetic waves.

Another object of the invention is to permit the use of conventional shielded cables for the transmission of the waves of unique character to which reference has been made.

Still another object of the invention is to provide a guided wave transmission system adapted for the simultaneous transmission of these unique waves and ordinary conduction current waves.

A further object is to improve the coupling between a hyper-frequency wave guide and its associated terminal circuit, and more particularly to suppress spurious type of waves.

The nature of the present invention and other objects, features and advantages thereof will appear more fully from a consideration of the following detailed description of specific embodiments that I have chosen for purposes of illustration. Reference will be made to the accompanying drawings, in which:

Figs. 19 and 20 illustrate a system for the simultaneous transmission of both these waves and ordinary waves over a coaxial conductor cable; and Figs. 21 to 27 illustrate systems embodying the invention wherein multiconductor shielded cables are employed.

Figure 1:
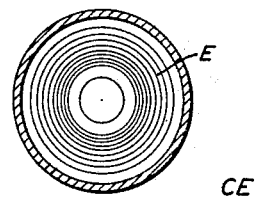
Figs. 1 to 10 represent the characteristic field patterns of five different types of hyper-frequency guided waves.

I have shown in my earlier application, supra, how electromagnetic wave energy can be transmitted with moderate attenuation through a guiding structure consisting essentially of a metallic pipe containing only a dielectric medium. A wide variety of kinds or types of electromagnetic waves can be transmitted through such a guiding structure, the different types being distinguished from each other by the characteristic spacial distribution of their component electric and magnetic fields. These waves, sometimes known as dielectrically guided waves, are unusual in several respects. In the first place they are hybrid waves, that is, the electric and magnetic field vectors E and H are not both strictly perpendicular to the direction of wave motion as in ideal conduction current systems known heretofore, but one field or the other may have a substantial longitudinal component. Another distinguishing feature that has been observed is the existence of a critical frequency, more or less sharply defined depending on the conductivity of the material comprising the pipe, which must be exceeded before sustained wave propagation can take place. In other words, the guide presents the characteristic of a high-pass filter. The critical frequency has been found to be dependent on the transverse dimensions of the guiding structure and on the type of the wave to be transmitted, as will appear more fully hereinafter.

The various types of waves with which the present invention is concerned may conveniently be divided into two classes, transverse magnetic and transverse electric, or TM and TE as abbreviated. Transverse magnetic waves are those hybrid waves in which the vector H lies transversely to the direction of wave propagation and transverse electric waves are those in which the vector E is so directed. Both TM and TE waves may be further catalogued as to order and mode of transmission. The order of a wave is determined by the manner in which the longitudinal field intensity, electric or magnetic, varies from point to point along any circle coaxial with the guide; whereas the mode of transmission is determined by the manner in which the longitudinal field intensity varies from point to point along a radius of the guide. It can be shown that in a TM wave the longitudinal electric current density is proportional to $$J_n\left(\xi_m \frac{\rho}{a}\right)\cos n\phi$$

where $\xi_m$ is the $m$th positive root of $J_n(\xi_m)=0$, $\rho$ is the radial distance of any given point from the axis of the guide, $a$ is the radius of the guide, and $\varphi$ is the angular distance of any given point from an arbitrarily chosen reference axis. Similarly in a TE wave it can be shown that the longitudinal magnetic current density is proportional to $$J_n\left(\xi_m \frac{\rho}{a}\right)\cos n\phi$$

where $\xi_m$ is the $m$th positive root of $J'_n(\xi_m)=0$. In either case $n$ is the order of the wave and $m$ the mode.

In the foregoing paragraph it has been implicitly assumed that the metallic pipe guide is circular in cross-section. This assumption is made only in the interest of simplifying the exposition of the invention, inasmuch as guides of other than circular cross-section are contemplated. The same may be said of the practical embodiments of the invention hereinafter to be described.

Figure 2:
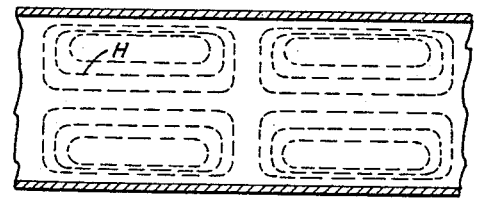
Figure 3:
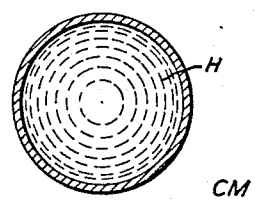
Figure 4:
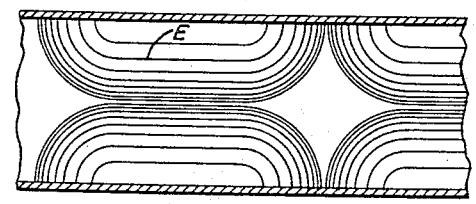
Figure 5:
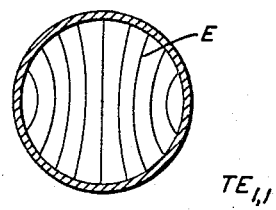
Figure 6:
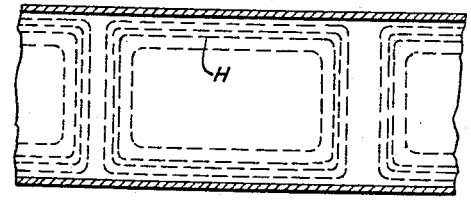
Figure 7:
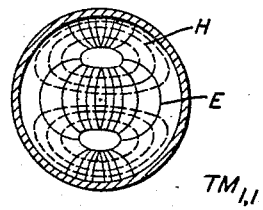
Figure 8:
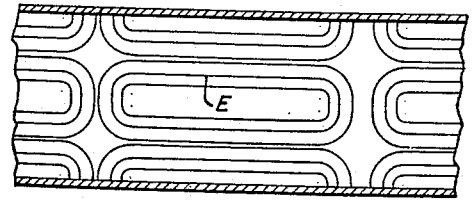
Figure 9:
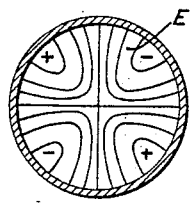
Figure 10:
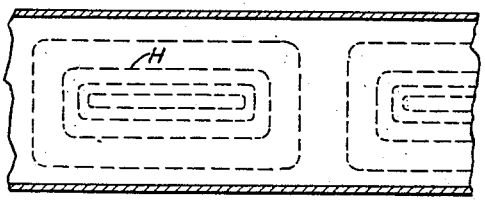

Referring now to Figs. 1 to 10, there are represented several principal types of hybrid waves. Figs. 1 and 2 represent the electric and magnetic fields, respectively, of the simplest type of transverse electric wave as it would exist in a tubular pipe guide, viz., a transverse electric wave of zero order and first mode, which is given the special designation circular electric or CE in view of the configuration of the electric field. Fig. 2, which is a longitudinal section of the guide, depicts the magnetic field, which is symmetrical about the axis of the guide and which it is evident has a substantial longitudinal component. Figs. 3 and 4 similarly depict a transverse magnetic wave of zero order and first mode, this particular type of wave being specially designated a circular magnetic or CM wave. Figs. 5 and 6 represent a transverse electric wave of first order and first mode; Figs. 7 and 8 a transverse magnetic wave of first order and first mode; and Figs. 9 and 10 a transverse electric wave of second order and first mode.

In Figs. 11 to 17 are shown suitable means for generating and receiving the five types of waves illustrated in Figs. 1 to 10.

Figure 11:
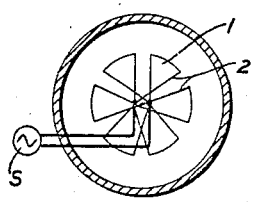
Figs. 11 to 18 show terminal structures adapted for the generation and reception of several different types of these waves.

Fig. 11 illustrates a form of terminal for the generation or reception of circular electric waves. This type of wave can be started in a tubular guide by establishing a circular current path coaxial with and transverse to the guide. The amount of energy transferred from this path to the wave will depend on the position of the path, that is, on its diameter. The most efficient transfer of energy is obtained with the current path placed in the region of maximum electric intensity, and assuming that the wave is of the fundamental mode, this region conforms with a circle the radius of which is 0.48 of the radius of the guide. A simple loop of wire is not recommended for the production of CE waves because of phase changes in the current traversing the loop, hence some means is desired for insuring that the current in the loop is substantially in phase at all points. Such means are provided in the terminal structure shown in Fig. 11 where a plurality of arcuate conducting wires 1 are connected in parallel through radial connectors 2 to the terminals of the signal source S. Alternatively, the conductors 2 may be brought out parallel to the axis of the guide for connection to the source. Preferably the length of each arcuate member is one-sixth of a wave-length or less for if the lengths are greater there is a strong tendency for waves other than circular electric waves to be generated. Where the terminal structure is to be used for receiving purposes the source S may be replaced by a suitable receiver.

As further insurance against the production of types of waves other than circular electric, a plurality of exciting current loops of different diameters may be provided, each of them supplied with current of phase and intensity appropriate to the region of the guide in which they are placed. Thus for a circular electric wave of fundamental mode the current in all of the loops would be in phase and graduated in amplitude in accordance with the function $$J_1\left(\frac{\rho}{a}\right)$$

maximum in the loop having a diameter 0.48 of the diameter of the guide and diminishing in loops of both greater and lesser diameter.

Figure 12:
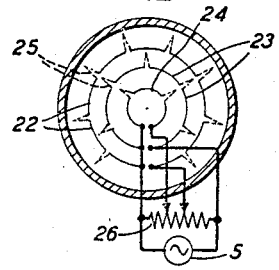

In the terminal structure shown schematically in Fig. 12 an approach to the desired distribution of the exciting field is made by providing two current loops in addition to the one of 0.48 diameter shown in Fig. 11. In each current loop the arcuate members 22, 23, 24 are connected in series with signal source S through phase shifting, radial loops 25 of suitable lengths, these loops being represented schematically in the drawing by dotted lines. The series connection of the arcuate members results in greater impedance than would be obtained by the parallel connection shown in Fig. 11. To secure the required current amplitudes in the three current loops any suitable means may be provided for regulating or fixing the respective resistances or applied voltages. For purposes of illustration the several loops are shown connected across different portions of a voltage divider 26.

Figure 13:
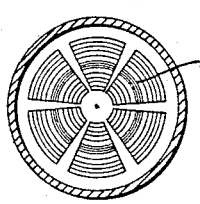
Figure 13A:
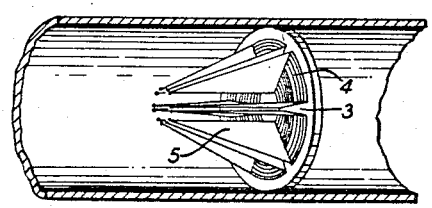

Another appropriate structure for inhibiting the production of spurious wave types is illustrated in Figs. 13 and 13A where a transverse disc 3 of insulating material is coated in a plurality of sectorial areas with a thin layer 4 of conducting material. The resistance of the coating varies in a radial direction in such manner that with a voltage applied between the radial edges of each sectorial plate the greatest current flows in the arcuate path corresponding to maximum electric intensity in the guided wave, and the current flowing in the other arcuate paths varies from this maximum in accordance with $$J_1\left(\frac{\rho}{a}\right)$$

Again the arcuate dimensions of the sectorial plates should be small in comparison with the wave-length. A sputtered coating of varying thickness may be utilized to obtain the required variation in resistance.

To connect the sectorial members 4 with the source, conducting plates 5 lying in radial planes and tapered in width from the radial dimension of the sectorial members to a size suitable for connection to ordinary wires may be used as illustrated in Fig. 13A. Various specific arrangements of the connecting members are possible and they may be connected for example, either in series or in parallel with each other.

In a broad aspect, the principle underlying the structures shown in Figs. 12 and 13 is to provide an exciting field that at every point in the vicinity of the terminal is of magnitude, phase and direction appropriate for only the specific kind of wave it is desired to set up. In a negative aspect, an exciting force is set up in a region corresponding to a node of a wave it is desired to inhibit.

Figure 14:
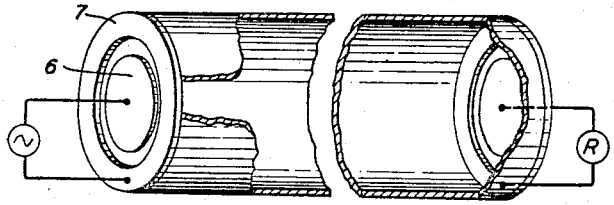

In Fig. 14 is shown a terminal structure suitable for circular magnetic waves, comprising a metallic disc 6 concentric with the guide and an annular coplanar metallic member 7 disposed over the end of the tubular pipe. It will be found desirable in some cases, for impedance matching purposes, to eliminate the member 7. The translating device is connected between disc 6 and the electrode 7 or the pipe itself.

Figure 15:
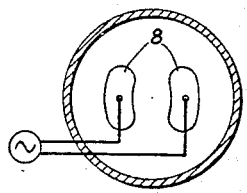

For generating or receiving $TM_{11}$ waves one may use the terminal structure illustrated in Fig. 15 where there are provided two coplanar roughly elliptical or kidney-shaped electrodes 8 each roughly conforming with the lines of magnetic force represented in Fig. 7.

Figure 16:
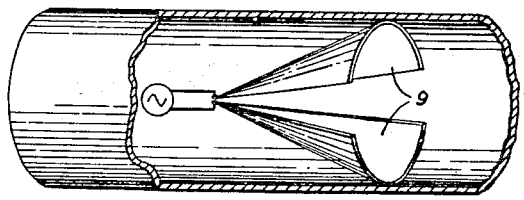

For transverse electric waves of first order and first mode the split cone terminal structure shown in Fig. 16 may be employed. This terminal comprises two semi-conical metallic members 9 which are disposed with their smaller ends in the immediate vicinity of the translating device and with their larger ends disposed in contact with the metallic pipe guide. Over the end of the pipe a metallic reflector may be provided, the distance of the reflector from the terminal structure being critically adjusted for maximum power output into the guide.

Figure 17:
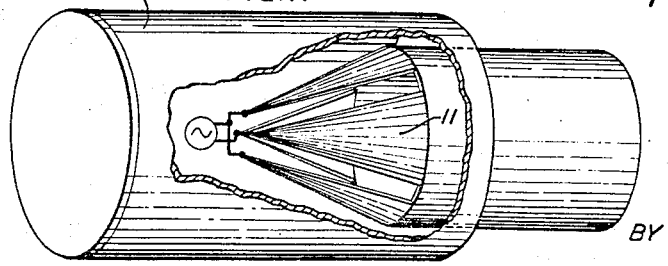
Figure 18:
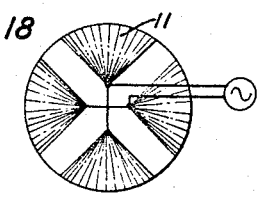

Figs. 17 and 18 show another form of the split cone terminal adapted for transverse electric waves of second order and first mode. In this case, the split cone comprises four elements 11 extending from the periphery of the pipe guide to the translating device, the latter being connected as indicated in Fig. 18. An enclosing metallic chamber 12 may be disposed over and around the translating device and terminal structure, in the manner shown, to prevent the escape of electromagnetic energy into space. The closed end of the chamber 12 may serve the same purpose as the reflector in Fig. 16. The principles illustrated in Figs. 16 to 18 may be extended to terminal structures for transverse electric waves of higher order by providing a greater number of semi-conical members. In the latter case, especially, one or more of these members may be left unconnected without substantially affecting the operation of the structure.

Having now described several representative types of guided waves and suitable terminal structures for generating and receiving these different types I shall proceed with the description of illustrative embodiments of my invention wherein these waves are transmitted over structures other than hollow pipes and wherein also these waves are multiplexed with ordinary conduction current waves.

In the system illustrated in Figs. 19 and 20, circular electric waves are propagated through a guide comprising a pair of coaxial conductors. The electric field in a CE wave is circular and coaxial with the guide, and at the axis of the guide the electric intensity is zero. There is no longitudinal component of the electric field. Accordingly, the presence of the axial conductor 16 has no substantial effect on the transmission of the CE wave. The electric field associated with the transmission of ordinary conduction current waves along a pair of coaxial conductors is radial, and therefore at every point substantially perpendicular to the field of the CE wave. Accordingly, both kinds of waves may be transmitted over the coaxial pair and separated from each other at a receiving terminal without substantial mutual interference. Utilizing these facts, the system shown in Fig. 19 comprises a multiplex carrier telephone terminal 13 connected between the two conductors of the guide for operation in the usual manner with conduction currents. A carrier television terminal 14 is also provided and connected to a guided wave terminal structure 15 adapted to produce CE waves within the conducting tube. The terminal structure 15 is shown only schematically, and it is to be understood as representative of one of the preferred CE terminals illustrated in Figs. 12 and 13. At the distant end of the system are provided terminal structures and circuits, which may be identical with those at the proximate end, for selectively receiving the carrier telephone and television signals. The two kinds of waves may be transmitted in the same or in different frequency ranges.

A somewhat different principle of operation is involved in the system illustrated in Figs. 21 and 22 where the conduction current system comprises a pair of conductors 18 disposed within the tubular metallic guide and where the type of guided wave is the $TE_{11}$. In this case the guided wave terminal comprises simply a pair of conductors 17 extending radially from the axially disposed sources to diametrically opposite points on the internal wall of the pipe. The wires 18 connected to the wave source 13 are disposed in a plane that is orthogonal to the radial wires 17 as shown more clearly in Fig. 22. Under these circumstances the electric field of the guided wave is perpendicular to the conducting wires 18 so that there is little or no tendency for the guided wave to establish longitudinal conduction currents in them, hence this structure is appropriate for the transmission of $TE_{11}$ waves. At the same time the field associated with the conduction current system is roughly orthogonal to that of the guided wave, so that the two waves may be fairly readily separated from each other at the receiving end of the system by structure and circuit similar to that shown in Fig. 21. Opposite, radially disposed metallic baffles 20 may be provided, as indicated in Fig. 22, to preclude rotation of the guided wave.

The shielded pair cable is adapted also to transmit $TM_{11}$ waves, as shown in Figs. 23 and 24. The electrode structure for the guided wave is of the kind illustrated in Fig. 15, the two electrodes being positioned on a line orthogonal to that joining the two conductors 18. It is evident from Fig. 24 that the magnetic field of the guided wave does not link the circuit comprising the two conductors 18, hence there is little interference between the two kinds of waves.

Fig. 25 shows how a $TE_{21}$ wave can be transmitted over a guide comprising a shielded quad and also how the two pairs of conductors comprising the quad may be energized in the usual manner to provide two additional, conduction current circuits.

Figs. 26 and 27 are believed to be self-explanatory, Fig. 26 showing a CE wave in a shielded pair cable and Fig. 27 a CM wave in the same kind of cable. In both cases the pair of conductors may be utilized for the transmission of conduction current waves.

What is claimed is:

1. A multiplex transmission system comprising a wave guide having a metallic lateral boundary and at least one conductor within said boundary and longitudinally coextensive therewith, means for transmitting through said guide electromagnetic waves of such characteristic field pattern that the guide presents to them the characteristic of a high-pass filter, and means for simultaneously transmitting through said guide other electromagnetic waves characterized by the flow of conduction current through said one conductor.

2. In a signaling system, a wave guide comprising a metallic pipe and at least one conductor disposed within said pipe and substantially coextensive therewith, means for transmitting signal-modulated transverse electromagnetic waves over a conducting system comprising said conductor and said pipe, and means for concurrently transmitting signal-modulated hybrid electromagnetic waves through the interior of said pipe.

3. In combination, a wave guide comprising a pair of coaxial conductors and means for launching in the space between said conductors for transmission therethrough hyperfrequency electromagnetic waves the electric field of which is transverse to the axis of said guide and substantially coaxial with said conductors.

4. A shielded cable comprising a hollow conductor and at least one inner conductor, and means for launching in said hollow conductor for transmission therethrough hybrid electromagnetic waves in which the longitudinal electric intensity is substantially zero in the region occupied by said inner conductor or conductors.

5. A combination in accordance with claim 4 in which the electric field intensity is substantially zero in the vicinity of said conductor or conductors.

6. A wave guide comprising a metallic pipe carrying hyperfrequency hybrid waves of transverse electric type and a terminal structure in energy transfer relation with said waves comprising a conducting loop for the flow of conduction currents, said loop lying in registry with a closed transverse path of maximum electric intensity in said waves.

7. A wave guide comprising a metallic pipe containing a gaseous dielectric medium through which are transmitted hyperfrequency electromagnetic waves the transverse electric field of which is represented, at least in part, by a family of closed electric intensity loops, and a current path in energy transfer relation with said waves, said current path conforming with the loop of maximum electric intensity.

8. A wave guide consisting essentially of a metallic pipe of circular cross-section for the transmission of circular electric waves and means for sustaining an electrical current in a circular current path that is coaxial with and transverse to said pipe, the diameter of said path being substantially half the diameter of said pipe, said means being adapted for launching or receiving said waves.

9. In combination with a wave guide comprising a gas-filled metallic pipe, means for launching hybrid waves of circular electric type comprising means for producing a substantially uniphase flow of high frequency alternating current in a path lying in an antinode of the transverse electric field of said waves.

10. In combination with a signal source and a dielectric guide, a wave launching terminal for said guide excited from said source, said launching terminal being so proportioned and arranged that the wave-exciting field generated therein varies in intensity transversely of the axis of said guide in accordance with the field intensity distribution of a particular type of guided wave.

11. In combination with a cylindrical dielectric guide and a terminal circuit, a terminal structure for establishing an energy transfer relation with circular electric waves in said guide comprising a plurality of circular current loops, the diameter of one of said loops being half the diameter of said guide, and connections from all of said loops to said terminal circuit.

12. A combination in accordance with claim 11 in which some of said loops are larger and some smaller than said loop of fixed diameter.

13. In combination with a wave guide consisting essentially of a metallic pipe and carrying dielectrically guided waves of transverse electric type therein, means for establishing a conduction current sheet in energy transfer relation with said waves, the current intensity in said sheet varying transversely to the direction of current flow in conformity with the variations in field intensity in said waves.

14. In combination, a dielectric guide, means for generating or receiving circular electric guided waves comprising a plurality of sectorial conducting members disposed transversely to and coaxial with said guide, and a conduction current circuit connected to both radial edges of a plurality of said members, the current intensity in arcuate paths of said members varying in the radial direction in a manner corresponding to the field intensity of a circular electric wave.

15. The method of utilizing a wave sustaining medium bounded by a dielectric discontinuity for the distance transmission of energy which comprises propagating concurrently within said medium two types of electromagnetic waves, in one of which the electric and magnetic field vectors are both substantially wholly transverse to the direction of propagation and in the other of which one of said vectors has a component in the direction of propagation.

16. In combination, a cable comprising a metallic pipe and a pair of conductors disposed within said pipe and coextensive therewith, said conductors being spaced apart and insulated from each other, means for launching in said pipe hybrid electromagnetic waves of a type other than circular, and means for inhibiting rotation of said waves with respect to said conductors.

SERGEI A. SCHELKUNOFF.